United States Patent [19]
Kwon

[11] Patent Number: 5,751,894
[45] Date of Patent: May 12, 1998

[54] RECORDING/REPRODUCING SYSTEM OF A DVCR

[75] Inventor: Tae-Kyong Kwon, Kyungki-do, Rep. of Korea

[73] Assignee: LG Electronics, Inc., Seoul, Rep. of Korea

[21] Appl. No.: 533,067

[22] Filed: Sep. 25, 1995

[30] Foreign Application Priority Data

Sep. 27, 1994 [KR] Rep. of Korea ............... 1994/24285

[51] Int. Cl.$^6$ ............... H04N 5/911; H04N 7/64
[52] U.S. Cl. ............... 386/116; 386/113
[58] Field of Search ............... 386/116, 113, 386/114, 93, 20, 21; 368/241, 533, 534, 535

[56] References Cited

U.S. PATENT DOCUMENTS 5,381,239  1/1995  Reime ............... 386/25

*Primary Examiner*—Robert Chevalier
*Attorney, Agent, or Firm*—John P. White

[57] ABSTRACT

A recording/reproducing system of a DVCR for detecting an error resulting from a noise or system instability caused by a reproducing process, and correcting the error under correctable conditions converts input digital data into an INRZI signal via a precoder to record the INRZI signal which is restored via a PR4 equalizer and a PR4 detector. The system includes an error detecting/correcting part for detecting occurrence of an error by using a peak waveform and (−) peak waveform from the PR4 detector, an approximate signal of a precoder output detected from an output of the PR4 equalizer, and a peak waveform from the PR4 detector to check whether they correspond to regular rules of a channel modeling process, and correcting the error in case of producing under correctable conditions. Here, a PR4 channel modeling characteristic is utilized to detect the error and correct the error under correctable conditions, so that bit error rate can be decreased to obtain a playback signal relevant to an original input signal. Furthermore, it can be applied to a recording/reproducing system using a magnetic disc channel as well as that using a magnetic tape channel for the purpose of heightening the error correction rate.

5 Claims, 4 Drawing Sheets

RECORDING/REPRODUCING SYSTEM OF A DVCR

BACKGROUND OF THE INVENTION

1. Field of the Invention

The present invention relates to a recording/reproducing system of a DVCR, and more particularly to a recording/reproducing system of a DVCR for detecting an error produced due to a noise or system instability during a reproducing process, and correcting the detected error in case of occurring under correctable conditions.

2. Description of the Prior Art

FIG. 1 illustrates a construction of a general recording/reproducing system using a magnetic tape.

The general recording/reproducing system using the magnetic tape, as shown in FIG. 1, includes a partial response (hereinafter simply referred to as "PR") encoder 1, a recording driver 2, a record/playback head 3, an amplifier/PR equalizer 4 and a PR detector 5.

PR encoder 1 converts coded parallel Non Return to Zero (NRZ) digital data received from a data processor or other input unit into a continuous serial PR signals.

Recording driver 2 changes pulse strings to have a signal size and clock suitable for record/playback head 3 for recording them on the magnetic tape, and includes a circuit for generating clocks corresponding to the data pulse.

Record/playback head 3 records the pulse strings from recording driver 3 on the magnetic tape, and reproduces the pulse strings recorded on the magnetic tape.

Amplifier/PR equalizer 4 amplifies and PR equalizes an analog signal reproduced by record/playback head 3 to provide a continuous analog signal synchronized with a playback clock.

PR detector 5 converts the analog signal from amplifier/PR equalizer 4 into the original digital signal.

The operation of the general recording/reproducing system using the magnetic tape will be described below.

The coded parallel NRZ digital data from the data processor or another input unit becomes the continuous serial PR signal in PR encoder 1.

The reason of changing the input data into the PR signal is in that a loss during the recording/reproducing operation can be decreased to thus restore the original signal when the characteristic of the signal is similar to a channel characteristic because channels of the magnetic tape is limited.

The continuous serial PR signal from PR encoder 1 is changed into a signal suitable for being recorded in recording driver 2 on record/playback head 3, i.e., the pulse strings having the proper size and clock, and recorded on the magnetic tape by record/playback head 3.

Also, the analog signal reproduced by record/playback head 3 after being recorded on the magnetic tape is supplied to amplifier/PR equalizer 4, and the continuous analog signal having passed through amplifier/PR equalizer 4 is synchronized with the playback clock, thereby being restored into the original digital signal in PR detector 5.

FIG. 2 illustrates a channel modeling process of a general PR4 system.

In order to perform the channel modeling of the PR4 system, a precoder 11, a record/playback head 12, a decoder 13 and a code detector 14 are required as shown in FIG. 2. Referring to FIG. 2, the general channel modeling process of the PR4 system will be described.

Input digital data $a_k$ is converted into an Interleaved Non Return to Zero Inverse (hereinafter simply referred to as "INRZI") signal in precoder 11.

Precoder 11 performs modulo-2 operation upon input data $a_k$ (where $a_k$=+1 or 0) and 2-bit delayed record data $b_{k-2}$ to convert them into the INRZI signal. The reason of performing the INRZI coding in precoder 11 is for blocking the transmission of an error caused by a noise added during the reproducing operation or unstable system.

The INRZI signal operated in precoder 11 as described above is written on the magnetic tape via record/playback head 12.

Then, a signal excited by record/playback head 12 has a differential characteristic 1-D which is an inherent characteristic of the magnetic tape.

The signal reproduced and output from record/playback head 12 is supplied to be decoded in decoder 13 via an unshown amplifier.

Decoder 13 adds a playback signal $/c_k$ and a signal delayed for one bit $/c_{k-1}$ to produce an output signal $/b_k$.

At this time, output signal $/b_k$ of decoder 13 has three numerical values +1, 0 and −1 which are changed in code detector 14 such that +1 becomes 1, so that the signal is reproduced into the original input signal having two numerical values.

FIG. 3 shows a construction of a conventional recording/reproducing system using the signal of actual PR4 system, and FIG. 4 shows signal waveforms of respective parts of FIG. 3.

The conventional recording/reproducing system using the signal of the actual PR4 system includes a precoder 21, a record amplifier 22, a record/playback head 23, a playback amplifier 24, a PR4 equalizer 25 and a PR4 detector 26.

Precoder 21 changes an input signal into the INRZI signal, and record amplifier 22 amplifies an output signal of precoder 21.

Record/playback head 23 records an output signal of record amplifier 23 on a magnetic tape, and reproduces the signal recorded on the magnetic tape.

Playback amplifier 24 amplifies a signal reproduced by record/playback head 23, PR4 equalizer 25 amplifies an output of playback amplifier 24, and PR4 detector 26 restores an output signal of PR4 equalizer 25 into the original digital signal.

An operation of the conventional recording/reproducing system using the actual PR4 system will be described with reference to FIG. 4.

An input signal $a_k$ supplied into precoder 21 has a waveform as shown in FIG. 4A, and converted into the INRZI signal $b_k$ in precoder 21 to have a waveform as shown in FIG. 4B. The signal $b_k$ from precoder 21 is amplified by record amplifier 22 and recorded on the magnetic tape by record/playback head 23.

After this operation, a signal is reproduced by record/playback head 23, in which the signal reproduced by record/playback head 23, i.e., a voltage excited by record/playback head 23, is amplified by playback amplifier 24 and, then, equalized in PR4 equalizer 25.

A signal $c_k$ equalized to be output from PR4 equalizer 25 has an analog waveform as shown in FIG. 4C.

A white Gaussian noise Nk is added during the recording/reproducing process. Thus, assuming that a signal obtained by adding the Gaussian noise $N_k$ to the original signal $c_k$ is designated by $/c_k$, this signal $/c_k$ has the waveform having an error as shown in FIG. 4D, and is restored as the original input signal $/a_k$ via PR4 detector 26, but the error probably occurs due to the noise or system instability.

Therefore, it should be checked whether the error occurs or not before restoring data. Thereafter, the error must be detected and corrected if the error occurs.

Meantime, when the error is produced in the sixth bit of this signal $c_k$ to change the signal level from +1 into 0 providing that the normal output signal $c_k$ of PR4 equalizer 25 is as shown in FIG. 4C, the signal $/c_k$ having the error is as shown in FIG. 4D.

By applying threshold values to up and down of the output signal $/c_k$ of PR4 equalizer 25, a waveform $pk^+$ of (+) peak and a waveform $pk^-$ of (−) peak can be obtained as shown in FIGS. 4E and 4F.

Consequently, a waveform after detecting every peak regardless of (+) direction or (−) direction, i.e., a waveform $p_k$ obtained by adding waveform $pk^+$ to waveform $pk^-$, can be obtained as shown in FIG. 4G.

If the output signal $/c_k$ of PR4 equalizer 25 is normal data without including any error, the peak detecting waveform pk is the same as the original output data $b_k$ of precoder 21. However, if the error is produced during the recording or reproducing process, the peak waveform pk becomes different from the original output data $b_k$ of precoder 21.

As the result, it should be checked in advance whether the error occurs or not, and the searching process thereof is executed as follows.

First, an approximate signal of the output $b_k$ of precoder 21, i.e., a signal $/b_k$ with an error is obtained, which is obtained by performing an exclusive ORing of the peak waveform $P_k$ which is the output of PR4 detector 26 having the error and approximate signal $/b_k$ of the precoder output which is fedback and delayed by 2 bit.

Approximate signal $/b_k$ of the precoder output obtained as above is output during being processed in PR4 detector 26.

At this time, approximate signal $/b_k$ of the precoder output has a regular interrelation with (−) peak waveform pk in such a manner that, if the (−) peak waveform $pk^-$ is low, the waveform of approximate signal $/b_k$ of the precoder output is unchanged; and, if the (−) peak waveform $pk^-$ is high, the waveform of approximate signal $/b_k$ of the precoder output should always have low value to be recognized as a normal value.

Here, if the (−) peak waveform $pk^-$ is high and the waveform of approximate signal $/b_k$ of the precoder output is high, an error waveform $e_k$ having a pulse as shown in FIG. 4I is generated, thereby supplying the pulse to inform of the detection of the error.

Also, the pulse of approximate signal $/b_k$ of the precoder output is inverted into low at the bit supplying error pulse $e_k$ in order to obtain normal output signal $b_k$ without having the error.

But, as shown in FIG. 4, the actual error occurred at 6th bit, but the error is detected at 12th bit. Thus, the error is not instantly detected but propagated for 6 bits prior to being detected.

Accordingly, even though the error is detected, the accurate point of producing the error cannot be estimated, so that the error detection has heretofore executed while the detected error cannot be corrected.

In other words, a PR4 signal having an inherent differential characteristic of a magnetic tape is utilized to be recorded and reproduced for performing a high density recording on the magnetic tape in the conventional DVCR system. This PR4 system is widely adopted since it is similar to channels of the magnetic tape, has small signal levels and is easy to be embodied. However, when an error occurs in a signal reproduced due to a noise added during the signal transmission or a system instability caused by inconsistent contact of a head to a tape contact surface, the error can be detected but cannot be corrected.

SUMMARY OF THE INVENTION

The present invention is devised to solve the above-described problems. Accordingly, it is an object of the present invention to provide a recording/reproducing system in a DVCR for checking whether a playback signal corresponds to rules of a PR4 channel modeling process or not prior to restoring data to detect whether an error can be corrected or not in case of occurring the error, thereby correcting the error under correctable conditions.

To achieve the above object of the present invention, there is provided a recording/reproducing system of a DVCR for converting input digital data into an INRZI signal via a precoder to record the INRZI signal, and restoring it via a PR4 equalizer and a PR4 detector, in which an error detecting/correcting part detects occurrence of an error by using a peak waveform and (−) peak waveform from the PR4 detector, an approximate signal of a precoder output detected from an output of the PR4 equalizer, and a peak waveform from the PR4 detector to check whether they correspond to regular rules of a channel modeling process, and corrects the error in case of producing under correctable conditions.

BRIEF DESCRIPTION OF THE DRAWINGS

The above objects and other advantages of the present invention will become more apparent by describing in detail preferred embodiments thereof with reference to the attached drawings in which:

FIG. 4A-4I shows signal waveforms of respective parts of FIG. 3;

FIG. 7A-7H shows signal waveforms of respective parts of FIGS. 5 and 6.

DETAILED DESCRIPTION OF THE PREFERRED EMBODIMENT

Figure 5:
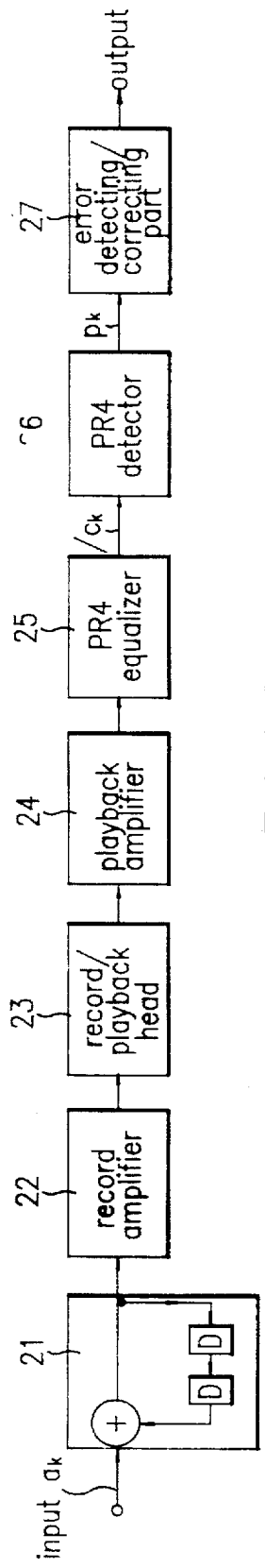
FIG. 5 shows a construction of a recording/reproducing system of a DVCR according to the present invention.
Figure 6:
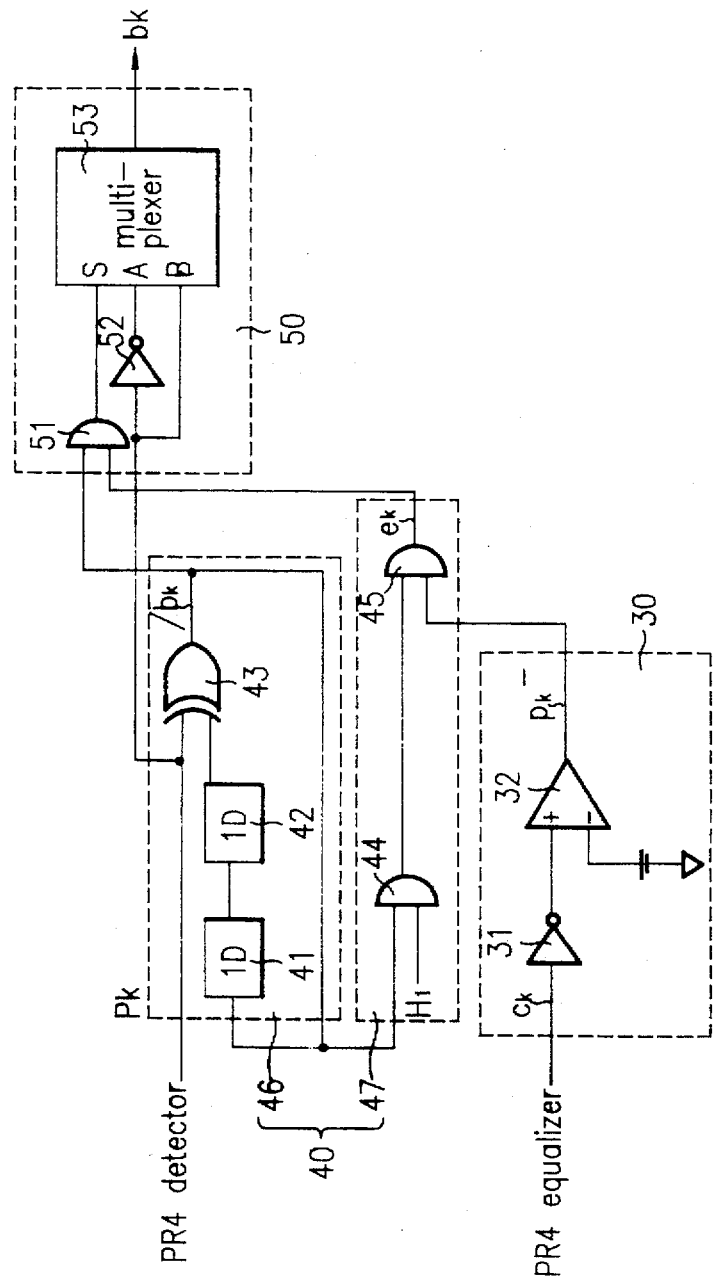
FIG. 6 shows a detailed construction of the error detecting/correcting part of FIG. 5.

Referring to FIG. 5, a recording/reproducing system of a DVCR according to the present invention will be described.

Figure 1:
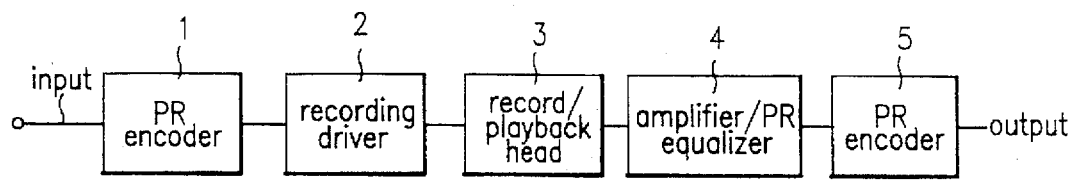
FIG. 1 shows a construction of a general recording/reproducing system using a magnetic tape.
Figure 2:
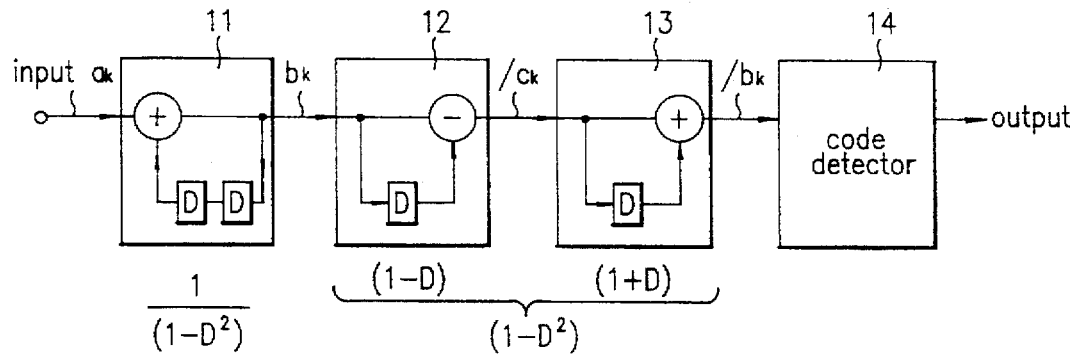
FIG. 2 is a view for illustrating a channel modeling process of a general PR4 system.
Figure 3:
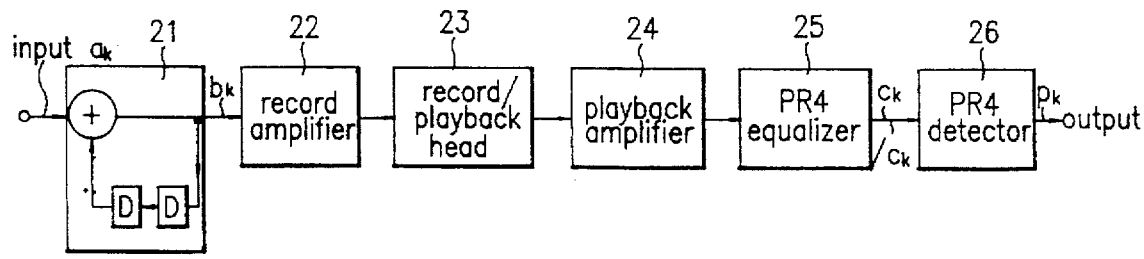
FIG. 3 shows a construction of a recording/reproducing system utilizing the signal of the actual PR4 system.
Figure 4:
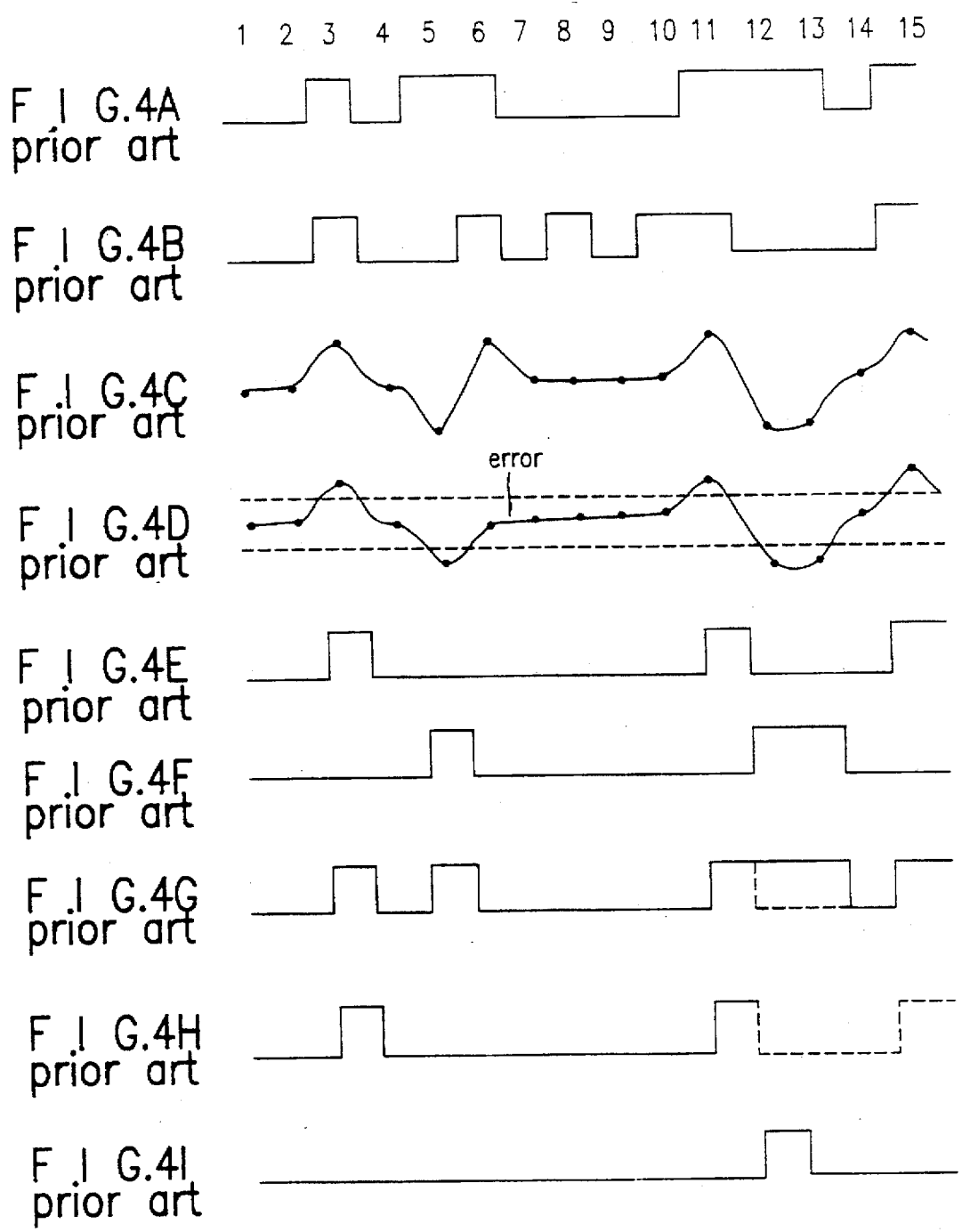
FIG. 4 including

The recording/reproducing system according to the present invention as illustrated in FIG. 5 is constructed by connecting an error detecting/correcting part to an output terminal of PR4 detector 26 of the recording/reproducing system utilizing the general PR4 signal as shown in FIG. 3.

That is, the recording/reproducing system of the DVCR according to the present invention includes a precoder 21, a record amplifier 22, a record/playback head 23, a playback amplifier 24, a PR4 equalizer 25, a PR4 detector 26 and an error detecting/correcting part 27.

Here, precoder 21, record amplifier 22, record/playback head 23, playback amplifier 24, PR4 equalizer 25 and PR4 detector 26 carry out the same function as those of the conventional recording/reproducing system as shown in FIG. 3.

In more detail, precoder 21 changes an input signal into an INRZI (Interleaved Non Return to Zero Inverse) signal, and record amplifier 22 amplifies an output signal of precoder 21. Record/playback head 23 records an output signal of record amplifier 22 on a magnetic tape, and reproduces the signal recorded on the magnetic tape.

Playback amplifier 24 amplifies a signal reproduced by record/playback head 23, PR4 equalizer 25 amplifies an output of playback amplifier 24, and PR4 detector 26 restores an output signal of PR4 equalizer 25 into an original digital signal.

Error detecting/correcting part 27 uses a peak waveform $P_k$ from PR4 detector 26, an approximate signal $/b_k$ of the precoder output and a (—) peak waveform $pk^-$ detected from an output $/c_k$ of PR4 equalizer 25, and a peak waveform pk from PR4 detector 26 for checking the corresponding to regular rules during a channel modeling process to detect an error occurrence, thereby correcting the error when the error produced is under correctable conditions.

Here, the correctable conditions of the detected error is that the error is not propagated and instantly detected at the bit of producing the error. More specifically, this conditions are that one-bit delayed signal of a signal obtained by adding a noise to an output of PR4 equalizer 25 is +1 or −1, and the level transient of the signal added with the noise to the output of PR4 equalizer 25 becomes −1.

Error detecting/correcting part 27 is formed of a (−) peak waveform generating section 30 for detecting a (−) peak waveform $pk^-$ from output $/c_k$ of PR4 equalizer 25, and an error detecting section 40 for generating an error pulse ek of a playback signal by means of approximate signal $/b_k$ of the precoder output detected from peak waveform $P_k$ from PR4 detector 26 and a (−) peak waveform $pk^-$ from (−) peak waveform generating section 30. Additionally, an error correcting section 50 corrects the detected error by using the error pulse from error detecting section 40, and approximate signal $/b_k$ of the precoder output and peak waveform pk from PR4 detector 26 when the error detected is under correctable conditions.

Here, (−) peak waveform generating section 30 is formed of an inverter 31 for inverting output $/c_k$ of PR4 equalizer 25, and a comparator 32 for comparing an output of inverter 31 with a lower threshold to provide (−) peak waveform $pk^-$.

Error detecting section 40 includes an approximate signal generator 46 for detecting to output approximate signal $/b_k$ of the precoder output from peak waveform pk supplied from PR4 detector 26 to error correcting section 50, and an error pulse generator 47 for generating an error pulse $e_k$ when the error occurs in the playback signal by means of approximate signal $/b_k$ of the precoder output from approximate signal generator 46 and (−) peak waveform $pk^-$ from (−) peak waveform generating section 30.

Here, approximate signal generator 46 is formed of an exclusive OR gate 43 for supplying approximate signal $/b_k$ of the precoder output using peak waveform pk from PR4 detector 26 as one input, and a delay unit for delaying approximate signal $/b_k$ of precoder output from exclusive OR gate 43 by 2 bits to provide the result to other input of exclusive OR gate 43. The delay unit is formed by serially connecting one-bit delays 41 and 42.

Also, error pulse generator 47 has an AND gate 44 for perform an AND operation of approximate signal $/b_k$ of the precoder output from approximate signal generator 46 and a high level signal as inputs, and an AND gate 45 for performing the AND operation of a signal from AND gate 44 and (−) peak waveform pk- from (−) peak waveform generating section 30 to supply error pulse $e_k$ to error corrector 50.

Error corrector 50 is formed of an AND gate 51 for performing the AND operation of approximate signal $/b_k$ of the precoder output and error pulse $e_k$ from error detecting section 40, an inverter 52 for inverting peak waveform pk from PR4 detector 26, and a multiplexer 53 for selecting to output either one of an output of inverter 52 and peak waveform pk from PR4 detector 26 in accordance with an output of AND gate 51.

An operation of the recording/reproducing system of the DVCR according to the present invention constructed as above will be described with reference to FIG. 7.

Input signal $a_k$ supplied to precoder 21 is provided to PR4 detector 26 via the identical process to that of the general recording/reproducing system utilizing the PR4 signal shown in FIG. 3.

That is, input signal $a_k$ supplied into precoder 21 has a waveform as shown in FIG. 7A, and is converted into the INRZI signal $b_k$ in precoder 21 to have a waveform as shown in FIG. 7B. The signal $b_k$ from precoder 21 is amplified by record amplifier 22 and recorded on the magnetic tape by record/playback head 23.

After this operation, the signal is reproduced by record/playback head 23, in which the signal reproduced by record/playback head 23, i.e., a voltage excited by record/playback head 23, is amplified by playback amplifier 24 and, then, equalized in PR4 equalizer 25.

A signal $c_k$ equalized to be output from PR4 equalizer 25 has an analog waveform as shown in FIG. 7C.

The signal $c_k$ from PR4 equalizer 25 is detected by PR4 detector 26 to be output as peak waveform pk.

If peak waveform pk from PR4 detector 26 is data without an error, it becomes identical to output signal $b_k$ of precoder 21 to enable complete data restoration.

However, a white Gaussian noise $N_k$ is added during recording/reproducing process. Thus, assuming that the signal obtained by adding white Gaussian noise $N_k$ to original signal $c_k$ is designated as $/c_k$, the signal $/c_k$ is formed of the waveform having the error as shown in FIG. 7D.

Accordingly, the error should be detected and corrected via error detecting/correcting part 27.

For performing the error detection and correction, signal $c_k$ from PR4 equalizer 25 is imposed by the lower end threshold at (−) peak waveform generating section 30 to be output as (−) peak waveform $pk^-$.

In other words, signal $c_k$ from PR4 equalizer 25 is inverted in inverter 31, and compared with the lower end threshold in comparator 32, thereby being provided as (−) peak waveform $pk^-$ as shown in FIG. 7E.

At this time, approximate signal generator 46 performs the exclusive ORing of peak waveform pk from PR4 detector 26 as shown in FIG. 7F and approximate signal $/b_k$ of the precoder output from exclusive OR gate 43 delayed for 2 bits via 1-bit delays 41 and 42 in exclusive OR gate 43, thereby outputting approximate signal $/b_k$ from the precoder output as shown in FIG. 7G.

Approximate signal $/b_k$ of the precoder output from exclusive OR gate 43 of approximate signal generator 46 is delayed in 1-bit delays 41 and 42 by 2 bits, and fedback to be supplied to exclusive OR gate 43.

Approximate signal $/b_k$ of the precoder output from exclusive OR gate 43 of approximate signal generator 46 is supplied to error pulse generator 47 to be utilized in generating the error pulse.

That is, approximate signal /$b_k$ of the precoder output and high level signal from approximate signal generator 46 are subjected to the AND operation in AND gate 44, and in turn the result is subjected to AND operation with (−) peak waveform pk⁻ from comparator 32 of (−) peak waveform generating section 30 to output error pulse $e_k$ as shown in FIG. 7H.

As illustrated in FIG. 7H, error pulse $e_k$ is generated in the high state when the error occurs, thereby informing of the error detection.

But it cannot be realized whether the detected error occurs at the current position or is generated before several bits to be propagated.

Thus, the conditions which enable the instant detection of the error without propagating the error should be examined.

To begin with, the input terminal of AND gate 51 of error correcting section 50 is checked. In other words, when approximate signal /$b_k$ of the precoder output from error detector 40 is high, the error occurs just at the point of detecting the error.

Therefore, multiplexer 53 selects peak waveform pk from PR4 detector 26 if the output of a selection terminal S, i.e., the output of AND gate 51, is low, and selects the inverted peak waveform from inverter 52 if the output of selection terminal S is high, thereby providing the selected result to a final output terminal.

As the result, output $b_k$ of multiplexer 53 is the playback signal in which the error produced during the recording/reproducing process is corrected in case of corresponding to the correctable conditions.

Figure 7:
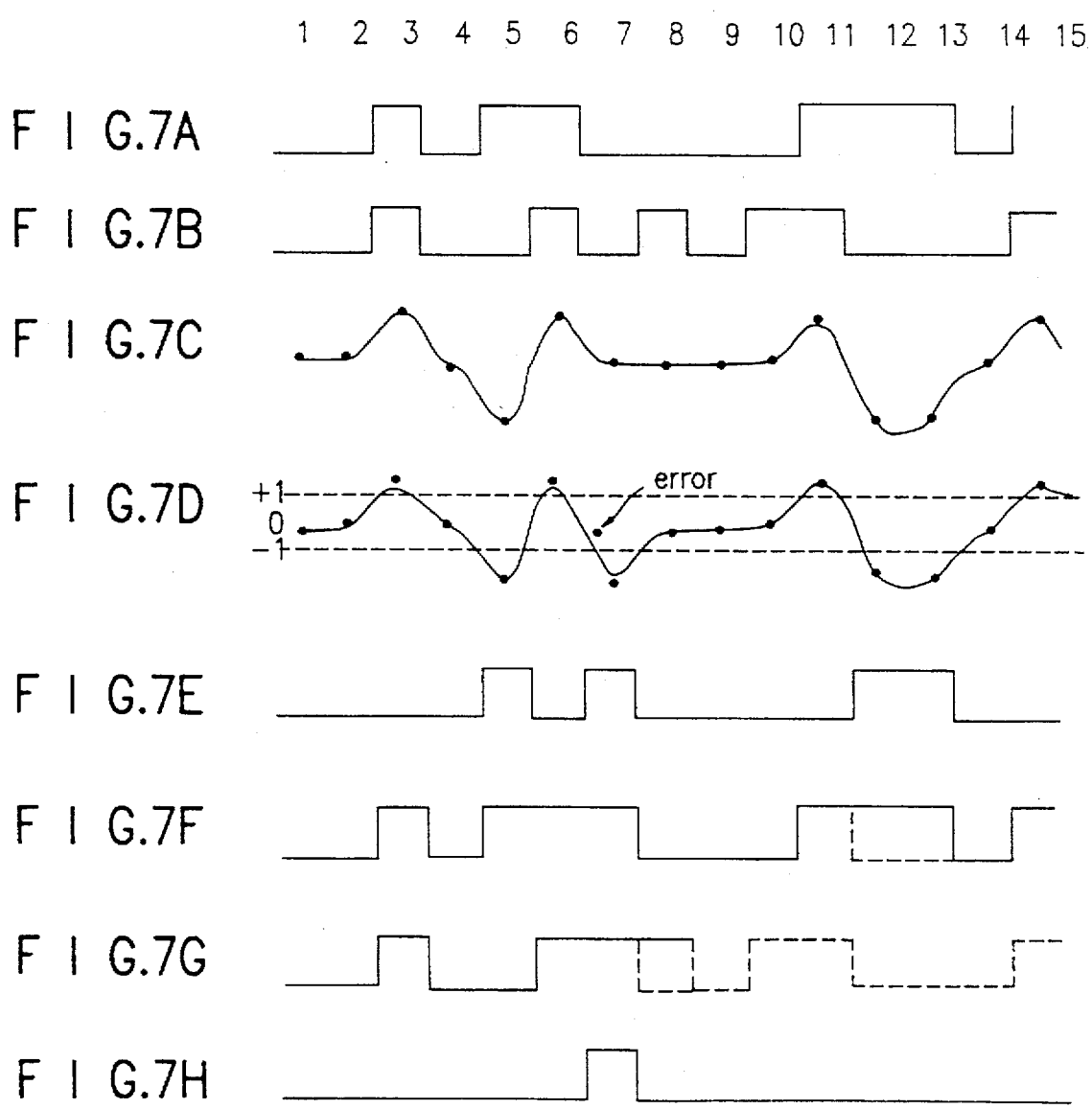
FIG. 7 including

In other words, as shown in FIG. 7, the error detecting process is identical to the conventional process, but, the error is not propagated and instantly detected at the bit position of producing the error when approximate signal /$b_k$ of the precoder output is high, i.e., 1-bit delayed signal /$c_{k-1}$ of signal /$c_k$ obtained by adding the noise to the output of PR4 equalizer 25 is +1 or −1, and the level transition of signal /$c_k$ obtained by adding the noise to the output of PR4 equalizer 25 is −1.

In this case, error pulse $e_k$ is supplied just at the point of producing the error, and peak waveform pk which is the output of PR4 detector 26 is inverted in accordance with the error signal to correct the error.

That is, in FIG. 7, when zero level of 67th-bit is transient to −1 due to the noise, it is instantly detected without propagating the error to easily correct the error. If the error is detected and corrected, the error detecting/correcting section is initialized to be operated again.

As described above, the PR4 channel modeling characteristic is utilized in the present invention to detect an error and correct the error under correctable conditions, so that bit error rate can be decreased to obtain a playback signal relevant to an original input signal. Furthermore, it can be applied to a recording/reproducing system using a magnetic disc channel as well as that using a magnetic tape channel for the purpose of heightening the error correction rate.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A recording/reproducing system of a DVCR for converting input digital data into an INRZI signal via a precoder to record said INRZI signal, and restoring it via a PR4 equalizer and a PR4 detector, comprising:

an error detecting part including;

a (−) peak waveform detector for detecting a (−) peak waveform from said PR4 detector, an approximate signal generator for approximating a position of error occurrence after the (−) peak waveform detected from said PR4 detector is delayed by 2 bits, and an error pulse generator for generating error pulses when the (−) peak waveform of the (−) peak waveform detector and the approximate signal of the approximate signal generator are received at the same time, and, an error correcting part including;

a gate part for subjecting the error pulses from the error pulse generator and 2 bits delayed (−) peak waveform from the approximate signal generator to an AND operation, an invertor for inverting said peak waveform from said PR4 detector, and a multiplexer for selectively providing the inverted peak waveform from said inverter and said peak waveform from said PR4 detector according to a result of the AND operation.

2. A recording/reproducing system of a DVCR as claimed in claim 1, wherein said (−) peak waveform generating section comprises:

an inverter for inverting said output of said PR4 equalizer; and a comparator for comparing an output of said inverter with a lower end threshold value to output said (−) peak waveform.

3. A recording/reproducing system of a DVCR as claimed in claim 1, wherein said approximate signal generator comprises:

an exclusive OR gate for outputting said approximate signal of said precoder output by means of said peak waveform from said PR4 detector as one input; and delays for delaying said approximate signal of said precoder output supplied from said exclusive OR gate by 2 bits to provide said delayed signal as other input of said exclusive OR gate.

4. A recording/reproducing system of a DVCR as claimed in claim 1, wherein said error pulse generator comprises:

a first AND gate for performing an AND operation of said approximate signal of said precoder output from said approximate signal generator and a high level signal as inputs; and a second AND gate for performing the AND operation of the signal from said first AND gate and said (−) peak waveform from said (−) peak waveform generator to supply said error pulse to said error correcting section.

5. A recording/reproducing system of a DVCR as claimed in claim 1, the case of instantly detecting said produced error just at the bit produced without propagating said error is that an one-bit delay signal of a signal obtained by adding a noise to said output of said PR4 equalizer is +1 or −1, and a level transition of said signal obtained by adding said noise to said output of said PR4 equalizer is −1.

* * * * *